United States Patent
Xu et al.

(10) Patent No.: US 11,724,292 B2
(45) Date of Patent: Aug. 15, 2023

(54) MEDIUM INTERNAL CIRCULATION ENHANCED THERMAL DESORPTION SOIL REMEDIATION REACTOR AND METHOD THEREOF

(71) Applicants: NANJING TECH UNIVERSITY, Jiangsu (CN); CSSC NANJING LUZHOU ENVIRONMENT PROTECTION CO., LTD., Jiangsu (CN); NANJING INSTITUTE OF ENVIRONMENTAL SECIENCES, MINISTRY OF ECOLOGY AND ENVIRONMENT OF THE PEOPLE'S REPUBLIC OF CHINA, Jiangsu (CN)

(72) Inventors: Haitao Xu, Nanjing (CN); Xiang Ling, Nanjing (CN); Shengtian Zhang, Nanjing (CN); Yongxian Zhou, Nanjing (CN); Jisai Chen, Nanjing (CN); Xiaofeng Wang, Nanjing (CN); Sun Hu, Nanjing (CN); Haiyan Qin, Nanjing (CN)

(73) Assignees: NANJING TECH UNIVERSITY, Nanjing (CN); CSSC NANJING LUZHOU ENVIRONMENT PROTECTION CO., LTD., Nanjing (CN); NANJING INSTITUTE OF ENVIRONMENTAL SCIENCES, Nanjing (CN)

( * ) Notice: Subject to any disclaimer, the term of this patent is extended or adjusted under 35 U.S.C. 154(b) by 0 days.

(21) Appl. No.: 17/545,861

(22) Filed: Dec. 8, 2021

(65) Prior Publication Data
US 2022/0176424 A1    Jun. 9, 2022

(30) Foreign Application Priority Data
Dec. 8, 2020 (CN) .......................... 202011423944.1

(51) Int. Cl.
*B09C 1/00* (2006.01)
*B09C 1/06* (2006.01)

(52) U.S. Cl.
CPC ..................................... *B09C 1/06* (2013.01)

(58) Field of Classification Search
CPC ......... B09C 1/06; B09C 2101/00; B09C 1/08; B09C 1/00; B09C 1/02; B09C 1/005;
(Continued)

(56) References Cited

U.S. PATENT DOCUMENTS

| 962,052 | A | * | 6/1910 | Roberts | .................. | B01D 33/76 |
|---|---|---|---|---|---|---|
| | | | | | | 210/377 |
| 2,042,254 | A | * | 5/1936 | Godinez | .................. | B02C 17/16 |
| | | | | | | 241/44 |

(Continued)

FOREIGN PATENT DOCUMENTS

| CN | 206676909 U | 11/2017 |
|---|---|---|
| CN | 109078976 A | 12/2018 |

(Continued)

*Primary Examiner* — Edwin J Toledo-Duran
(74) *Attorney, Agent, or Firm* — Oliff PLC

(57) ABSTRACT

A medium internal circulation enhanced thermal desorption soil remediation reactor and a method thereof, and belongs to the technical field of soil remediation. Internal circulation of a thermal medium is realized through a specially designed rotary drum structure, and a way for heating soil by utilizing oxidative decomposition of organic contaminants is provided, so that the treatment efficiency of an apparatus and the contaminant removal effect are improved significantly on the premise of not increasing the scale of the apparatus, and at the same time, the energy consumption of a system is reduced.

7 Claims, 2 Drawing Sheets

(58) Field of Classification Search
CPC .......... B09C 1/10; B09C 1/002; B09C 1/065;
B09C 1/067; B09C 1/085; B09C 1/062;
B09C 1/105; B09C 1/025; F23G 7/14;
F23G 2201/50; F23G 2209/24; F23G
5/027; F23G 5/40; F23G 5/0276; F23G
5/20; F23G 2203/8013; F23G 5/006;
F23G 7/07; F23G 5/0273; F23G
2202/103; F23G 2900/7011; F23G
2201/602; F23G 2201/701; F23G
2204/103; F23G 2205/18; F23G 5/02;
F23G 5/12; F23G 5/30; F23G 5/46; F23G
7/001; F23G 2201/301; F23G 2202/30;
F23G 2203/208; F23G 2203/601; F23G
2203/8016; F23G 2205/20; F23G
2206/10; F23G 2207/30; F23G 2209/30;
F23G 7/05; F23G 2201/40; F23G
2201/70; F23G 2201/80; F23G 5/085;
F23G 7/00; F23G 2201/303; F23G
2203/50; F23G 2203/70; F23G 2204/201;
F23G 2206/201; F23G 2207/40; F23G
2208/10; F23G 2209/12; F23G
2900/50212; F23G 2900/7007; F23G
5/34; F23G 5/50; F23G 2201/20; F23G
2201/302; F23G 2201/60; F23G
2202/101; F23G 2203/212; F23G
2203/30; F23G 2203/503; F23G
2203/801; F23G 2204/00; F23G 2204/10;
F23G 2204/101; F23G 2204/203; F23G
2207/20; F23G 2900/50009; F23G
2900/50201; F23G 2900/50203; F23G
2900/50205; F23G 2900/50209; F23G
2900/50213; F23G 2900/52002; F23G
2900/70; F23G 2900/7005; F23G 5/14;
F23G 5/24; F23G 5/448; F23G 7/008;
F23G 7/12; F23G 2201/603; F23G
2202/106; F23G 2203/209; F23G
2205/121; F23G 2207/101; F23G
2207/113; F23G 2209/10; F23G
2209/102; F23G 2209/20; F23G
2209/281; F23G 2900/00001; F23G
2900/50204; F23G 2900/50206; F23G
2900/50214; F23G 2900/54001; F23G
2900/55007; F23G 5/16; F23G 5/165;
F23G 5/32; F23G 5/444; B09B 3/00;
B09B 3/40; B09B 3/45; B09B 5/00;
B09B 1/00; B09B 3/21; B09B 3/25;
B09B 3/0066; B09B 3/29; B09B 3/80;
B09B 1/004; B09B 1/006; B09B 1/008;
B09B 3/0075; B09B 3/60; B09B 3/70;
B09B 2101/02; B09B 2101/75; B09B
2101/80; B09B 2101/85; B09B 2101/90;
B09B 3/20

See application file for complete search history.

(56) References Cited

U.S. PATENT DOCUMENTS

| | | | | |
|---|---|---|---|---|
| 2,776,875 A * | 1/1957 | Houdry | ................. | F01N 3/2832 422/179 |
| 3,797,763 A * | 3/1974 | Handle | ............... | B02C 18/0084 241/82.1 |
| 4,069,980 A * | 1/1978 | Yarem | .................... | A22C 17/04 241/74 |
| 4,149,842 A * | 4/1979 | Benjamin | ............. | F23D 11/404 431/165 |
| 4,279,197 A * | 7/1981 | Hunt | ....................... | B30B 9/125 100/98 R |
| 4,280,879 A * | 7/1981 | Taciuk | .................... | C10G 1/02 202/136 |
| 4,373,536 A * | 2/1983 | da Silva | .................. | A01F 11/06 460/80 |
| 4,867,572 A * | 9/1989 | Brock | ................. | E01C 19/1036 366/15 |
| 4,977,839 A * | 12/1990 | Fochtman | ................. | B09B 3/45 48/209 |
| 5,129,334 A * | 7/1992 | Mize | ........................ | F27B 7/02 432/106 |
| 5,164,158 A * | 11/1992 | Brashears | ............. | B01D 53/72 422/1 |
| 5,193,291 A * | 3/1993 | Brashears | ................. | B09C 1/06 110/236 |
| 5,273,355 A * | 12/1993 | May | .................... | E01C 19/1072 432/106 |
| 5,302,118 A * | 4/1994 | Renegar | .................... | F23G 7/14 432/106 |
| 5,378,059 A * | 1/1995 | Brock | ................. | E01C 19/1036 366/25 |
| 5,382,002 A * | 1/1995 | Evans | ....................... | B22C 5/08 432/112 |
| 5,466,418 A * | 11/1995 | Swanson | ................... | F23G 7/14 405/128.85 |
| 5,513,443 A * | 5/1996 | Hatfield | .............. | E01C 19/1036 34/106 |
| 5,517,929 A * | 5/1996 | Repnik | ..................... | B09C 1/06 110/190 |
| 5,664,882 A * | 9/1997 | Green | ..................... | B28C 5/466 432/118 |
| 5,904,904 A * | 5/1999 | Swanson | ................... | B09C 1/06 432/109 |
| 5,927,970 A * | 7/1999 | Pate | .......................... | B09C 1/06 432/115 |
| 5,971,657 A * | 10/1999 | Medico, Jr. | ............. | E01C 19/46 404/101 |
| 6,196,710 B1 * | 3/2001 | Swanson | ............. | E01C 19/1031 34/131 |
| 6,368,101 B1 * | 4/2002 | Briggs | ...................... | F23G 7/05 239/406 |
| 6,464,430 B1 * | 10/2002 | Maleck | .................... | B09C 1/06 405/128.85 |
| 6,615,710 B1 * | 9/2003 | Ishigaki | ................. | B01D 37/04 100/48 |
| 6,672,751 B2 * | 1/2004 | Hawkins | ............. | E01C 19/1036 366/58 |
| 2004/0035804 A1 * | 2/2004 | Bischof | .................. | B30B 9/121 210/770 |
| 2008/0039672 A1 * | 2/2008 | Cornellier | .................. | F23J 7/00 588/19 |
| 2011/0297016 A1 * | 12/2011 | Yamashita | ............ | C02F 11/147 100/145 |
| 2013/0206572 A1 * | 8/2013 | Valente | ..................... | F23K 1/04 202/151 |
| 2015/0040804 A1 * | 2/2015 | Aupperle | ............... | F23L 17/005 110/309 |
| 2016/0067637 A1 * | 3/2016 | Roiss | ..................... | B01D 29/90 210/405 |
| 2017/0136510 A1 * | 5/2017 | Shen | ......................... | B09C 1/06 |
| 2020/0216760 A1 * | 7/2020 | Ingolfsson | ......... | B01D 17/0205 |
| 2022/0090781 A1 * | 3/2022 | Thiessen | ................. | F23D 14/02 |

FOREIGN PATENT DOCUMENTS

| | | |
|---|---|---|
| CN | 109622587 A | 4/2019 |
| CN | 111408614 A | 7/2020 |
| CN | 111558611 A | 8/2020 |
| CN | 111644454 A | 9/2020 |
| CN | 211854052 U | 11/2020 |
| KR | 10-2008-0008154 A | 1/2008 |

\* cited by examiner

MEDIUM INTERNAL CIRCULATION ENHANCED THERMAL DESORPTION SOIL REMEDIATION REACTOR AND METHOD THEREOF

TECHNICAL FIELD

The present invention belongs to the technical field of soil remediation in a contaminated site, is applicable to the soil remediation in an organic contaminated site, and particularly relates to a medium internal circulation enhanced thermal desorption soil remediation reactor and a method thereof.

BACKGROUND

The soil refers to a loose surface layer which has fertility and can be used for plant growth on the surface of the land. When too many harmful substances are discharged into the soil beyond the self-cleaning capacity of the soil, the composition, structure and function changes of the soil may be caused, the microorganism activity is inhibited, the harmful substances or decomposition products thereof are gradually accumulated in the soil and are absorbed by human bodies indirectly through "soil→plants→human bodies" or through "soil→water→human bodies", and the soil contamination is generated if the contamination reaches the extent of harming the health of the human bodies.

At present, seriously contaminated sites mainly include chemical plants, pesticide plants, smelting plants, gas stations, chemical storage tanks, etc., contaminants in these sites are mainly organic contaminants, and these contaminants may be further divided into volatile organic matters, semi-volatile organic matters, persistent organic matters, pesticides and the like according to differences of their melting boiling points. Remediation technologies of these kinds of contaminated soil include incineration (cement kiln cooperative treatment), phytoremediation, bioremediation, chemical remediation, thermal desorption and the like, where the thermal desorption technology has the advantages of high treatment efficiency, short remediation period, device movability and the like, and is widely applied to remediation of volatile/semi-volatile organic contaminated sites. As shown by American EPA statistics results, thermal desorption cases account for 20% to 30% in European and American site remediation cases, and the thermal desorption technology is one of major technologies for site remediation.

According to different heating modes, thermal desorption is divided into two technologies: direct thermal desorption and indirect thermal desorption. The indirect thermal desorption technology is widely applied due to its advantages of high safety, low secondary contamination risk, soil recyclability after remediation.

According to the indirect thermal desorption technology, high-temperature smoke gas generated through combustion passes through a metal casing of a reactor to indirectly heat the contaminated soil, so that the contaminated soil is heated to reach a target temperature or higher. In the heating process, the high-temperature smoke gas is not in direct contact with the contaminated soil. By controlling the system temperature and the material dwell time, the organic contaminants are gasified and volatilized selectively, so that the organic contaminants are separated and removed from soil particles.

Generally, the weight of contaminated soil to be remediated in a contaminated site is thousands of tons for a small amount, and hundreds of thousands of tons for a great amount, and the remediated land needs to be used for real estate development urgently, so a remediation apparatus is required to have high treatment efficiency and high capacity to shorten the remediation period. The contaminated soil is distributed all over the country, and the apparatus needs to be frequently dismounted and mounted to change the use sites and to realize repeated utilization of the apparatus. Considering the mounting, transportation and dismounting of the apparatus, skid-mounted integration is required, and the size of a single structure is generally required not to exceed 3 m×3 m×12 m.

On the premise of not increasing the apparatus size, the heat transfer efficiency is limited by relying on the single heating mode of indirect heat transfer among the high-temperature smoke gas, the metal casing and the soil, the low treatment efficiency of an indirect thermal desorption apparatus is caused, the treatment capacity is generally 3 t to 4 t per hour, and the soil remediation requirements of medium and large contaminated sites cannot be met.

On the other hand, some big blocks of soil are compact, the heat is difficult to be transferred to the inside, the volatilization of the central organic contaminants is hindered, such that the low contaminant removal rate is caused, and is generally 90% to 95%, and the remediation requirements cannot be met for the thermal desorption effect of the heavily contaminated soil.

Additionally, heat of the existing thermal desorption technology is from fuel combustion, and a great amount of fuel needs to be consumed, and the remediation cost is high.

A screw rod type indirect thermal desorption device for organic contaminated soil remediation with an application number of 202010291492.X includes an outer drum arranged in a horizontal direction and a screw rod, where a belt material scraping material feeding machine is fixedly connected to an upper portion of the front end of the outer drum, and a discharging drum is fixedly connected to a lower portion of the rear end of the outer drum; three branched pipelines are disposed at the upper portion of the outer drum and are configured to collect tail gas; the three branched pipelines are gathered in a centralized pipeline, and a gas sampling opening is formed in the centralized pipeline; the screw rod is fixedly supported in the outer drum; a cavity configured to heat soil is formed in the screw rod, the rear end of the cavity is configured to introduce hot air, and the front end of the cavity is configured to exhaust hot air; and a flowing direction of the hot air in the cavity is opposite to the movement direction of the soil. A rotary kiln indirect thermal desorption system for soil remediation with an application number of 202020478031.9 includes a feeding device, a rotary kiln, a discharging device, a secondary combustion chamber and a heat exchanger, where the rotary kiln includes a kiln head, a base, a rotary kiln outer sleeve, a rotary kiln inner sleeve and a kiln tail, the rotary kiln inner sleeve is disposed in the rotary kiln outer sleeve to form a hot air interlayer, the rotary kiln outer sleeve is disposed on the base, the kiln head and the kiln tail are respectively disposed at two ends of the rotary kiln outer sleeve, the feeding device is connected to the kiln head, the discharging device is connected to the kiln tail, the heat exchanger is disposed on the secondary combustion chamber, the heat exchanger is connected to the hot air interlayer, and the secondary combustion chamber is connected to the kiln tail. These two patents disclose the typical indirect thermal desorption reactor structure principles, the heating mode is that the hot air indirectly heats the internal soil through the "outer drum" and "the rotary kiln inner sleeve", the heat transfer mode is single, and the heat transfer efficiency cannot be improved significantly under the conditions of certain size of the "outer drum" and "the rotary kiln inner sleeve"; due to the lack of a crushing measure on big blocks of soil, the contaminant removal rate is not high, and the heat sources are all fuel combustion, and the energy consumption is higher.

SUMMARY

The present invention provides a medium internal circulation enhanced thermal desorption soil remediation reactor and a method thereof by aiming at defects in the prior art.

The objective of the present invention may be achieved by using the following technical solutions:

A medium internal circulation enhanced thermal desorption soil remediation reactor includes a feeding device with a raw soil inlet, a feeding end fixing cover, a rotary drum and a discharging end fixing cover with a treated soil outlet. A thermal medium is provided in the rotary drum, and a discharging end of the rotary drum is provided with a material blocking sieve plate configured to separate soil from the thermal medium.

In the technical solution of the present invention, an outer cover with 2 smoke gas inlets and 1 smoke gas outlet is provided at the outer side of the rotary drum, internal pipe bundles are provided in an inner cavity of the rotary drum, a smoke gas inlet of the internal pipe bundles communicates with the smoke gas inlet of the outer cover, and a smoke gas outlet of the internal pipe bundles communicates with the smoke gas outlet in the outer cover.

An area between the outer side of the rotary drum and the inner side of the outer cover is a smoke gas jacket, the other smoke gas inlet of the rotary drum communicates with the smoke gas jacket, and the smoke gas outlet of the rotary drum is disposed above the feeding end fixing cover.

A feeding end of the reactor is higher than a discharging end in height, and an angle θ between an axis of the rotary drum and a horizontal line is 1° to 3°.

In the technical solution of the present invention, shovelling plates located at tail portions of the internal pipe bundles and being of L-shaped sieve screen structures are provided in the rotary drum, the shovelling plates are uniformly distributed in the circumferential direction along the tail portion of the rotary drum and are located in front of the material blocking sieve plate, and the sieve screen structures of the shovelling plates are configured to separate the soil from the thermal medium.

In the technical solution of the present invention, facing directions of the shovelling plates are consistent with the rotating direction of a drum body, and outer edges of the shovelling plates are flush with an inner surface of the drum body of the rotary drum.

In the technical solution of the present invention, the internal pipe bundles are distributed in a bell mouth shape in the inner cavity of the rotary drum, and a diameter of a circle at which the internal pipe bundles near a soil feeding end is located is greater, and a diameter of a circle at which the internal pipe bundles near a soil discharging end is located is smaller; and at the same time, a space among the internal pipe bundles near the soil feeding end is greater than the diameter of the thermal medium.

In the technical solution of the present invention, a space among the internal pipe bundles is greater than the diameter of the thermal medium, and the space is 1/10 to 1/30 of the length of the internal pipe bundles greater than the diameter of the thermal medium.

In the technical solution of the present invention, a collecting groove in inclined arrangement is provided on the discharging end fixing cover, and a groove body of the collecting groove passes through the material blocking sieve plate to go deep into the rotary drum so that the thermal medium lifted up by the shovelling plates is able to fall into the groove and roll onto a track formed by the internal pipe bundles.

In the technical solution of the present invention, the internal pipe bundles are in an inclined state with the lower feeding end and higher discharging end, and form an angle α being 2° to 3° with the horizontal line.

In the technical solution of the present invention, a diameter of a circle at which the center of the internal pipe bundles at the soil discharging end is located is smaller, and a diameter of a circle at which the center of the internal pipe bundles at the soil feeding end is located is greater, so the pipe space L of the discharging end is smaller, and is smaller than the diameter of the thermal medium, the pipe space L of the feeding end is greater, and is greater than the diameter of the thermal medium, and the angle and space structures of the internal pipe bundles provide a track for the thermal medium to roll from the discharging end to the feeding end.

In the technical solution of the present invention, a cover body has a dome-shaped cross section, and covers the outside of the rotary drum, and a partition wall is disposed between the two smoke gas inlets to separate the smoke gas jacket between the cover body and the rotary drum into a left cavity and a right cavity, so that the smoke gas inlet 1 corresponds to the discharging end of the internal pipe bundles at the right side of the partition wall, the smoke gas inlet 2 corresponds to the smoke gas jacket at the left side of the partition wall, one path of high-temperature smoke gas enters the discharging end of the internal pipe bundles from the smoke gas inlet 1 through the cavity at the right side of the partition wall, and then passes through the internal pipe bundles to be exhausted from the smoke gas outlet of the feeding end, the other path of high-temperature smoke gas enters the left side of the partition wall from the smoke gas inlet 2 and passes through the smoke gas jacket to be exhausted from the smoke gas outlet of the feeding end, and the two paths of high-temperature smoke gas respectively generate indirect heat exchange with the soil through the internal pipe bundles and the outer wall of the rotary drum in the flowing process.

In the technical solution of the present invention, the material blocking sieve plate is of a circular-ring-shaped sieve screen structure, sieve meshes are greater than the particle size of the soil but smaller than the outer diameter of the thermal medium, the circular ring inner hole diameter is 0.3 to 0.8 time of the diameter of the drum body, in the process of rotating along with the drum body, the thermal medium is intercepted and cannot pass through the material blocking sieve plate, and the soil is leaked out from the sieve meshes to fall into the discharging end fixing cover.

A method for thermal desorption soil remediation by using the above-mentioned reactor includes the following steps:

(1) conveying, by the feeding device, raw soil into the rotary drum, enabling the rotary drum to rotate around the axis and other portions to be stationary, feeding high-temperature smoke gas into the reactor from the 2 smoke gas inlets to generate indirect heat exchange with internal soil, achieving circumferential movement in the circumferential direction around the drum body and slow movement along the axial discharging end of the feeding end soil and thermal medium at the same time under duplex effects of rotating force and gravity of the drum body, heating the feeding end soil and the thermal medium to 300° C. to 600° C., then enabling the feeding end soil and the thermal medium to pass through sieve meshes of the material blocking sieve plate to enter the discharging end fixing cover, and finally discharging the soil and the thermal medium from the treated soil outlet;

(2) extruding and crushing big blocks of soil since the thermal medium in the rotary drum is always located at a lower portion of the drum body and moves towards the discharging end together with the soil along with the rotation of the drum body due to the gravity effect, intercepting the thermal medium by the material blocking sieve plate when the thermal medium reaches the discharging end, then, carrying the thermal medium by the shovelling plates to achieve rotation of the thermal medium to upper portions of the shovelling plates, falling into the collecting groove due to gravity, then rolling onto a center track formed by the internal pipe bundles, rolling to the feeding end along the track and movement again towards the discharging end along with the soil, and performing circulation in such a manner; and (3) achieving gradual temperature rise of the thermal medium at the lower portion of the drum body along with the soil movement, returning the high-temperature thermal medium at the discharging end to the feeding end after heat carrying to achieve a heating effect on the feeding end soil since the temperature is higher than that of the feeding end soil.

In the above method, a filling coefficient of the thermal medium in the rotary drum does not exceed 0.25, and a rotating speed of the drum body is 0.4 to 10 r/min.

In the above method, the thermal medium is of a spherical structure, an outer diameter is 1 to 2 cm greater than the particle size of the soil, and a material is microporous ceramics.

Beneficial effects of the present invention are as follows:

The present invention discloses a medium internal circulation enhanced rotary thermal desorption soil remediation reactor and a method thereof. The thermal medium internal circulation is achieved through a specially designed rotary drum structure, and additionally, a way for heating soil by utilizing oxidative decomposition of organic contaminants is provided. Through the two aspects, the contaminated soil thermal desorption process is enhanced. On one hand, the thermal medium can extrude and crush big blocks of soils, volatilization of organic contaminants coated at the inside is facilitated, and on the other hand, the thermal medium carries heat from the discharging end to the feeding end to achieve a heating effect on the feeding end soil.

The treatment efficiency of an apparatus and the contaminant removal effect are improved significantly on the premise of not increasing the scale of the apparatus, and at the same time, the energy consumption of a system is reduced.

In the figures, 1 denotes a feeding device, 2 denotes a feeding end fixing cover, 3 denotes a rotary drum, 4 denotes an outer cover, 5 denotes a discharging end fixing cover, 6 denotes a collecting groove, 7 denotes an internal pipe bundle, 8 denotes a shovelling plate, 9 denotes a thermal medium, 10 denotes soil, and 11 denotes a material blocking sieve plate.

DETAILED DESCRIPTION

The present invention is further described below with reference to the embodiments, but the protection scope of the present invention is not limited thereto.

Embodiment 1

Figure 1:
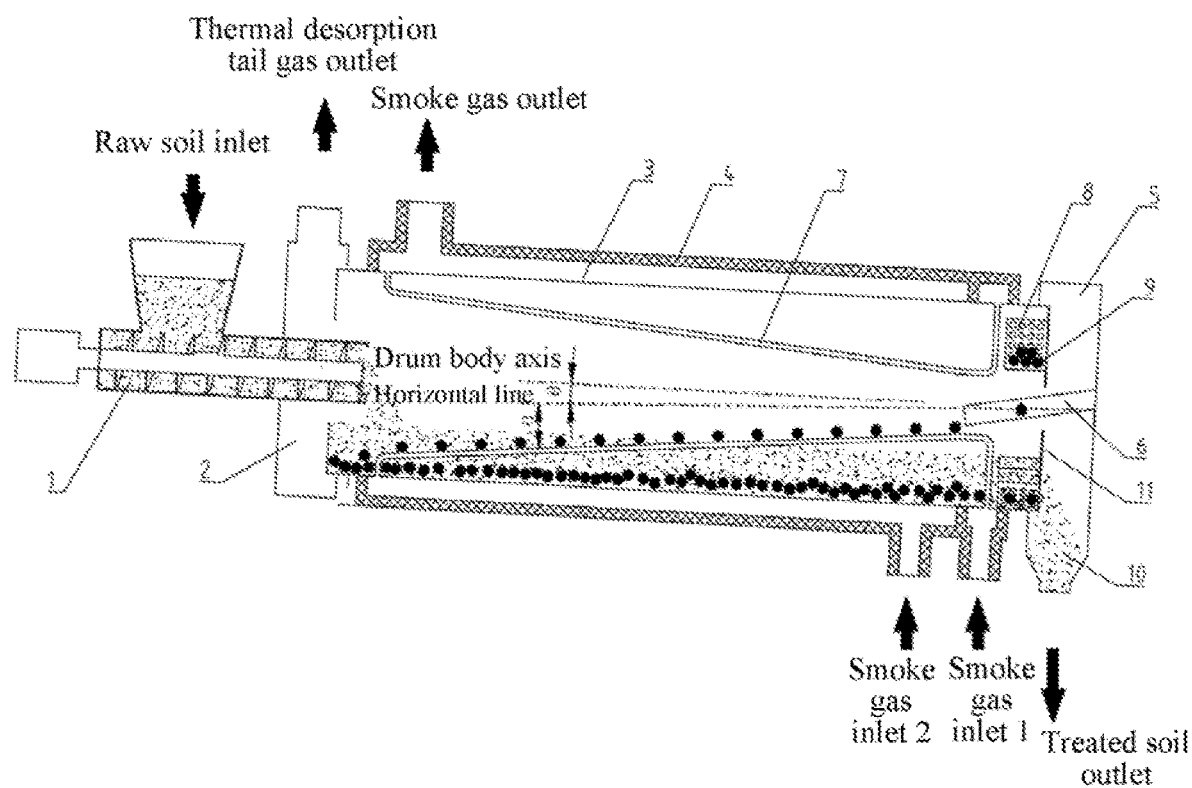
FIG. 1 is a schematic structural diagram of a cross section of a reactor of the present invention.
Figure 2:
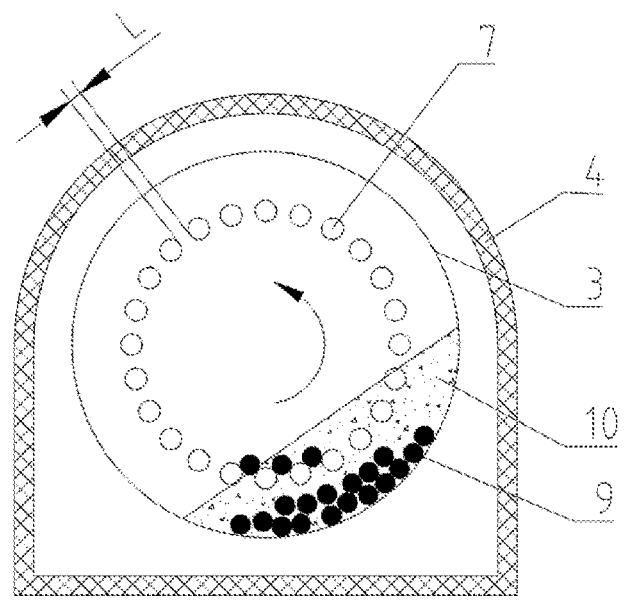
FIG. 2 is a schematic structural diagram of a longitudinal section of the reactor of the present invention.
Figure 3:
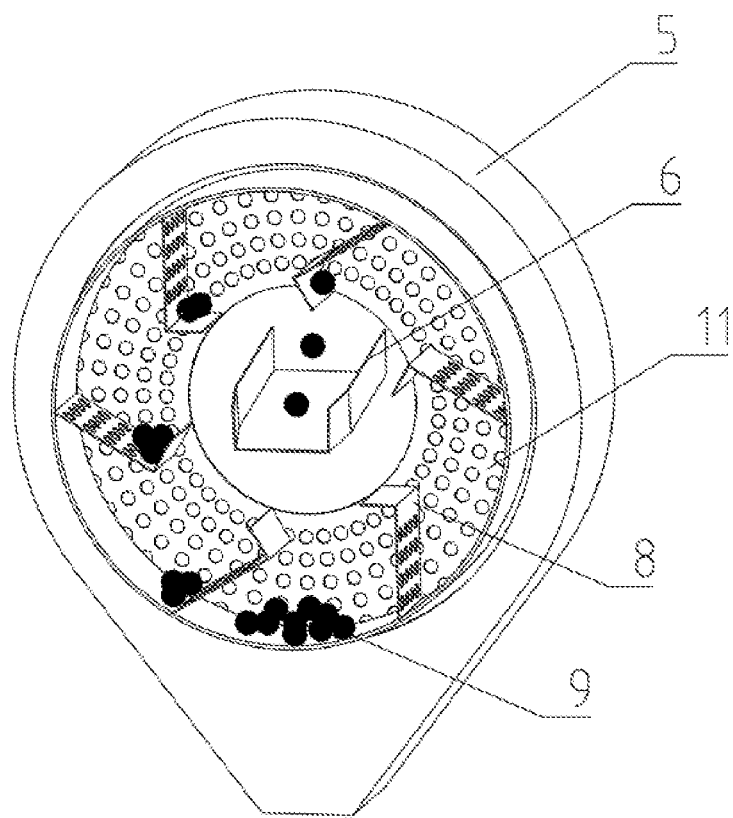
FIG. 3 is a schematic structural diagram of a local of a discharging end of the reactor of the present invention.

As shown in FIG. 1 to FIG. 3, a medium internal circulation enhanced thermal desorption soil remediation reactor included a feeding device 1 with a raw soil inlet, a feeding end fixing cover 2, a rotary drum 3 and a discharging end fixing cover 5 with a treated soil outlet. A thermal medium 9 was provided in the rotary drum 3, and a discharging end of the rotary drum 3 was provided with a material blocking sieve plate 11 configured to separate soil from the thermal medium.

An outer cover 4 with 2 smoke gas inlets and 1 smoke gas outlet was provided at the outer side of the rotary drum 3, the internal pipe bundles were provided in the rotary drum 3, a smoke gas inlet of the internal pipe bundles 7 communicated with the smoke gas inlet of the rotary drum 3, and the smoke gas outlet of the internal pipe bundles 7 communicated with the smoke gas outlet in the outer cover 4. An area between the outer side of the rotary drum 3 and the inner side of the outer cover 4 was a smoke gas jacket, the other smoke gas inlet of the rotary drum 3 communicated with the smoke gas jacket, and the smoke gas outlet of the rotary drum 3 was disposed above the feeding end fixing cover 2. A feeding end of the reactor was higher than a discharging end in height, and an angle θ between an axis of the rotary drum and a horizontal line was 1° to 3°.

The shovelling plates 8 located at right side of the internal pipe bundles and being of L-shaped sieve screen structures were provided in the rotary drum 3, the shovelling plates 8 were uniformly distributed in the circumferential direction along the tail portion of the rotary drum 3 and are located in front of the material blocking sieve plate 11. The sieve screen structures of the shovelling plates 8 were configured to separate the soil from the thermal medium 9. Facing directions of the shovelling plates 8 were consistent with the rotating direction of a drum body 3, the shovelling plates and the drum body were connected into a whole, and outer edges of the shovelling plates were flush with an inner surface of the drum body of the rotary drum.

The internal pipe bundles 7 were distributed in a bell mouth shape in the inner cavity of the rotary drum 3, and a diameter of a circle at which the internal pipe bundles near the soil feeding end was located was greater, and a diameter of a circle at which the internal pipe bundles near the soil discharging end was located was smaller; and at the same time, a space among the internal pipe bundles 7 near the soil feeding end was greater than the diameter of the thermal medium. The internal pipe bundles 7 were in an inclined state with the lower feeding end and higher discharging end, and formed an angle α being 2° to 3° with the horizontal line.

A diameter of a circle at which the center of the internal pipe bundles at the soil discharging end was located was smaller, and a diameter of a circle at which the center of the internal pipe bundles at the feeding end was located was greater, so the pipe space L of the discharging end was smaller, and was smaller than the diameter of the thermal medium 9, the pipe space L of the feeding end was greater, and was greater than the diameter of the thermal medium 9, and the angle and space structures of the internal pipe bundles 7 provided a track for the thermal medium 9 to roll from the discharging end to the feeding end.

A cover body had a dome-shaped cross section, and covered the outside of the rotary drum, and a partition wall was disposed between the two smoke gas inlets to separate the smoke gas jacket between the cover body and the rotary drum into a left cavity and a right cavity, so that the smoke gas inlet 1 corresponded to the discharging end of the internal pipe bundles at the right side of the partition wall, the smoke gas inlet 2 corresponded to the smoke gas jacket at the left side of the partition wall, one path of high-temperature smoke gas entered the discharging end of the internal pipe bundles from the smoke gas inlet 1 through the cavity at the right side of the partition wall, and then passed through the internal pipe bundles to be exhausted from the smoke gas outlet of the feeding end, the other path of high-temperature smoke gas entered the left side of the partition wall from the smoke gas inlet 2 and passed through the smoke gas jacket to be exhausted from the smoke gas outlet of the feeding end, and the two paths of high-temperature smoke gas respectively generated indirect heat exchange with the soil through the internal pipe bundles and the outer wall of the rotary drum in the flowing process.

A collecting groove 6 in inclined arrangement was provided on the discharging end fixing cover 5, and a groove body of the collecting groove 6 passed through the material blocking sieve plate 11 to go deep into the rotary drum 3 so that the thermal medium 9 lifted up by the shovelling plates 8 was able to fall into the groove and roll onto a track formed by the internal pipe bundles 7.

The material blocking sieve plate was of a circular-ring-shaped sieve screen structure, sieve meshes were greater than the particle size of the soil but smaller than the outer diameter of the thermal medium, the circular ring inner hole diameter was 0.3 to 0.8 time of the diameter of the drum body, in the process of rotating along with the drum body, the thermal medium was intercepted and cannot pass through the material blocking sieve plate, and the soil was leaked out from the sieve meshes to fall into the discharging end fixing cover.

A method for thermal desorption soil remediation by using the above-mentioned reactor included the following steps:

(1) Soil was conveyed into the rotary drum 3 by the feeding device 1 with the raw soil inlet, the rotary drum 3 rotated around the axis, and other portions were stationary. High-temperature smoke gas entered the reactor from the 2 smoke gas inlets to generate indirect heat exchange with internal soil 10, the feeding end soil and thermal medium did circumferential movement in the circumferential direction around the drum body and slow movement along the axial discharging end at the same time under duplex effects of rotating force and gravity of the drum body, were heated to 300° C. to 600° C., then passed through sieve meshes of the material blocking sieve plate to enter the discharging end fixing cover, and were finally discharged from the treated soil outlet.

(2) Big blocks of soil were extruded and crushed since the thermal medium in the rotary drum (3) was always located at a lower portion of the drum body and moved towards the discharging end together with the soil along with the rotation of the drum body. The thermal medium was intercepted by the material blocking sieve plate when the thermal medium reached the discharging end. Then, the thermal medium was carried by the shovelling plates, rotated to upper portions of the shovelling plates, fell into the collecting groove due to gravity, then rolled onto a center track formed by the internal pipe bundles, rolled to the feeding end along the track, and then moved again towards the discharging end along with the soil. The circulation was performed in such a manner.

(3) The temperature of the thermal medium at the lower portion of the drum body gradually rose along with the soil movement, the high-temperature thermal medium at the discharging end returned to the feeding end after heat carrying to achieve a heating effect on the feeding end soil since the temperature was higher than the feeding end soil.

A filling coefficient of the thermal medium in the rotary drum did not exceed 0.25, and a rotating speed of the drum body was 0.4 to 10 r/min. The thermal medium 9 was of a spherical structure, an outer diameter was 1 to 2 cm greater than the particle size of the soil, and a material was microporous ceramics.

Application Example

The above system structures were used, the diameter of the inner cavity of the drum body of the reactor was 2 m, the length was 12 m, and the apparatus scale of the reactor was 3 m×3 m×12 m.

Operation conditions were as follows: the soil accumulation density was 1.3 t/m$^3$, the moisture content was 20%, and contaminants were volatile/semi-volatile organic matters.

The following effects were achieved: 10 t of contaminated soil was remediated per hour, the organic contaminant removal rate was 99% or higher, and 25 cubic meters of natural gas was averagely consumed for remediation of per ton soil.

Comparative Example 1

The conditions were the same as those in Embodiment 1 except that there was no thermal medium in the reactor, the diameter of the inner cavity of the drum body of the reactor was 2 m, the length was 12 m, and the apparatus scale of the reactor was 3 m×3 m×12 m.

The operation conditions were the same as those in Application example.

The following effects were achieved: 6 t of contaminated soil was remediated per hour, the organic contaminant removal rate was about 90% to 95%, and 40 cubic meters of natural gas was averagely consumed for remediation of per ton soil.

Comparative Example 2

An embodiment of a disclosure of Screw Rod Type Indirect Thermal Desorption Device for Organic Contaminated Soil Remediation with an application number of 202010291492.X was used, the diameter of the outer drum was set to be 2 m, the length was 12 m, and the apparatus scale of the reactor was 3 m×3 m×12 m.

The operation conditions were the same as those in Application example.

The following effects were achieved: 4 t of contaminated soil was remediated per hour, the organic contaminant removal rate was about 90% to 95%, and 40 cubic meters of natural gas was averagely consumed for remediation of per ton soil.

Comparative Example 3

An embodiment of a disclosure of Rotary Kiln Indirect Thermal Desorption System for Soil Remediation with an application number of 202020478031.9 was used, the diameter of a rotary kiln inner sleeve was set to be 2 m, the length was 12 m, and the apparatus scale of the reactor was 3 m×3 m×12 m.

The operation conditions were the same as those in Application example.

The following effects were achieved: 4 t of contaminated soil was remediated per hour, the organic contaminant removal rate was about 90% to 95%, and 40 cubic meters of natural gas was averagely consumed for remediation of per ton soil.

Comparative Results

Treatment Effects of Embodiment and Comparative Examples

| Item | Embodiment 1 | Comparative example 1 | Comparative example 2 | Comparative example 3 |
|---|---|---|---|---|
| Reactor specification | 2 m × 12 m | 2 m × 12 m | 2 m × 12 m | 2 m × 12 m |
| Apparatus scale of reactor | 3 m × 3 m × 12 m | 3 m × 3 m × 12 m | 3 m × 3 m × 12 m | 3 m × 3 m × 12 m |
| Weight of contaminated soil remediated per hour | 10 t | 6 t | 4 t | 4 t |
| Organic contaminant removal rate | ≥99% | 90-95% | 90-95% | 90-95% |
| Natural gas consumed averagely for remediation of per ton soil | 25 cubic meters | 40 cubic meters | 40 cubic meters | 40 cubic meters |

What is claimed is:

1. A thermal desorption soil remediation reactor, comprising:
    a feeding device that includes a raw soil inlet;
    a feeding end fixing cover provided at a feeding end of the reactor;
    a rotary drum provided between the feeding end of the reactor and a discharging end of the reactor;
    a discharging end fixing cover provided at the discharging end of the reactor, the discharging end fixing cover including a treated soil outlet;
    a material blocking sieve plate provided at a discharging end of the rotary drum and configured to separate soil from a thermal medium;
    a collecting groove that is inclined relative to an axis of the rotary drum, and is provided on the discharging end fixing cover, a groove body of the collecting groove passing through the material blocking sieve plate into the rotary drum;
    internal pipe bundles provided in the rotary drum;
    shovelling plates provided at the discharging end of the rotary drum, the shoveling plates being located at tail portions of the internal pipe bundles and being of L-shaped sieve screen structures, the shovelling plates being uniformly distributed in a circumferential direction along a tail portion of the rotary drum and being located in front of the material blocking sieve plate, and the sieve screen structures of the shovelling plates being configured to separate the soil from the thermal medium, the internal pipe bundles and the shovelling plates being configured such that the thermal medium lifted up by the shovelling plates is able to fall into the collecting groove and roll onto a track formed by the internal pipe bundles; and
    an outer cover with two smoke gas inlets and one smoke gas outlet, the outer cover being provided at an outer side of the rotary drum, the internal pipe bundles being disposed in an inner cavity of the rotary drum, a smoke gas inlet of the internal pipe bundles being in communication with one of the smoke gas inlets of the outer cover, and a smoke gas outlet of the internal pipe bundles being in communication with the smoke gas outlet in the outer cover; wherein:
    the feeding device and the rotary drum are configured to convey soil from the raw soil inlet to the rotary drum, and from the rotary drum to the treated soil outlet; and
    an area between the outer side of the rotary drum and an inner side of the outer cover is a smoke gas jacket, another one of the smoke gas inlets of the rotary drum is in communication with the smoke gas jacket, and the smoke gas outlet of the rotary drum is disposed above the feeding end fixing cover, the smoke gas jacket being configured to allow smoke gas fed in from the two smoke gas inlets to pass through the internal pipe bundles and around the rotary drum, and then out through the smoke gas outlet, thereby heating the soil and thermal medium as the soil and thermal medium pass through the rotary drum.

2. The thermal desorption soil remediation reactor according to claim 1, wherein facing directions of the shovelling plates are consistent with a rotating direction of a drum body of the rotary drum, and outer edges of the shovelling plates are flush with an inner surface of the drum body of the rotary drum.

3. The thermal desorption soil remediation reactor according to claim 1, wherein the internal pipe bundles are distributed in a bell mouth shape in the inner cavity of the rotary drum, and a diameter of a circle at which the internal pipe bundles near the feeding end are located is greater than a diameter of a circle at which the internal pipe bundles near the discharging end are located; and a space between the internal pipe bundles near the feeding end is greater than a diameter of the thermal medium.

4. A method for thermal desorption soil remediation by using the thermal desorption soil remediation reactor according to claim 1, comprising the following steps:
    (1) conveying, by the feeding device, raw soil into the rotary drum, enabling the rotary drum to rotate around the axis while other portions are stationary, feeding high-temperature smoke gas into the reactor from the two smoke gas inlets to generate indirect heat exchange with the soil in the rotary drum, achieving circumferential movement in the circumferential direction around the drum body and slow movement along the axial discharging end for the soil at the feeding end and thermal medium at the same time under duplex effects of rotating force of the drum body and gravity, heating the soil and the thermal medium to 300° C. to 600° C., then enabling the soil at the feeding end and the thermal medium to pass through sieve meshes of the material blocking sieve plate to enter the discharging end fixing cover, and finally discharging the soil and the thermal medium from the treated soil outlet;

(2) extruding and crushing big blocks of soil by the thermal medium, the thermal medium in the rotary drum being always located at a lower portion of the drum body and moving towards the discharging end together with the soil along with the rotation of the drum body due to gravity, intercepting the thermal medium by the material blocking sieve plate when the thermal medium reaches the discharging end, then, carrying the thermal medium by the shovelling plates to achieve rotation of the thermal medium to upper portions of the shovelling plates, the thermal medium falling into the collecting groove due to gravity, then rolling onto the track formed by the internal pipe bundles, rolling to the feeding end along the track, and moving again towards the discharging end along with the soil; and (3) achieving gradual temperature rise of the thermal medium at the lower portion of the drum body along with the soil movement, returning the high-temperature thermal medium at the discharging end to the feeding end after heat carrying to achieve a heating effect on the soil the temperature is higher than that of the soil at the feeding end.

5. The method according to claim 4, wherein a filling coefficient of the thermal medium in the rotary drum does not exceed 0.25, and a rotating speed of the drum body is 0.4 to 10 r/min.

6. The method according to claim 5, wherein the thermal medium is of a spherical structure, an outer diameter of the thermal medium is 1 to 2 cm greater than a particle size of the soil, and a material of the thermal medium is microporous ceramics.

7. The thermal desorption soil remediation reactor according to claim 1, wherein the feeding end of the reactor is higher than the discharging end in height, and an angle θ between the axis of the rotary drum and a horizontal line is 1° to 3°.

* * * * *